United States Patent
Yao et al.

(10) Patent No.: US 11,966,058 B2
(45) Date of Patent: Apr. 23, 2024

(54) ULTRA-THIN LENS, VIRTUAL IMAGE DISPLAY DEVICE USING SAME, AND NEAR-EYE DISPLAY

(71) Applicant: Beijing NED+AR Display Technology Co., Ltd., Beijing (CN)

(72) Inventors: Cheng Yao, Beijing (CN); Yuhao Xiao, Beijing (CN); Dewen Cheng, Beijing (CN)

(73) Assignee: Beijing NED+AR Display Technology Co., Ltd., Beijing (CN)

( * ) Notice: Subject to any disclaimer, the term of this patent is extended or adjusted under 35 U.S.C. 154(b) by 192 days.

(21) Appl. No.: 17/809,063

(22) Filed: Jun. 27, 2022

(65) Prior Publication Data

US 2023/0213762 A1 Jul. 6, 2023

(30) Foreign Application Priority Data

Dec. 31, 2021 (CN) .......................... 202111674598.9

(51) Int. Cl.
*G02B 27/01* (2006.01)
(52) U.S. Cl.
CPC .... *G02B 27/0172* (2013.01); *G02B 2027/014* (2013.01); *G02B 2027/0178* (2013.01); *G02B 2027/0192* (2013.01)
(58) Field of Classification Search
CPC .......... G02B 27/0172; G02B 2027/014; G02B 2027/0178; G02B 2027/0192
See application file for complete search history.

(56) References Cited

U.S. PATENT DOCUMENTS

| | | | | |
|---|---|---|---|---|
| 5,701,202 A * | 12/1997 | Takahashi | .......... | G02B 17/0816 359/633 |
| 5,745,295 A * | 4/1998 | Takahashi | .......... | G02B 17/0816 359/627 |
| 5,886,824 A * | 3/1999 | Takahashi | ............ | G02B 17/086 359/633 |
| 6,023,373 A * | 2/2000 | Inoguchi | ............ | G02B 27/0172 349/11 |
| 6,028,709 A * | 2/2000 | Takahashi | ............ | G02B 17/086 359/633 |
| 6,181,475 B1 * | 1/2001 | Togino | ................ | G02B 17/0856 359/630 |
| 6,222,677 B1 * | 4/2001 | Budd | ................. | G02B 27/0172 359/638 |
| 6,384,983 B1 * | 5/2002 | Yamazaki | .......... | G02B 27/0172 359/837 |

(Continued)

*Primary Examiner* — Charles L Beard
(74) *Attorney, Agent, or Firm* — Syncoda LLC; Feng Ma

(57) ABSTRACT

An ultra-thin lens for augmented reality (AR) display includes: a primary lens, an intermediate lens, and a secondary lens. After entering the primary lens, image light undergoes two total reflections, then enters the intermediate lens and is partially reflected, then is directed to a human eye through the intermediate lens and the primary lens. The secondary lens is configured on the other side of the intermediate lens, and environmental light is directed to the human eye through the secondary lens, the intermediate lens, and the primary lens. According to the ultra-thin lens, total reflection and light splitting functions of the image light are realized respectively through the primary lens and the intermediate lens, so that the entire lens has a thin and light profile.

20 Claims, 10 Drawing Sheets

(56) References Cited

U.S. PATENT DOCUMENTS

| | | | | |
|---|---|---|---|---|
| 6,760,169 B2* | 7/2004 | Takahashi | G02B 17/0816 | 359/834 |
| 7,027,229 B2* | 4/2006 | Inoguchi | G02B 27/0025 | 359/630 |
| 8,508,830 B1* | 8/2013 | Wang | G02B 27/0172 | 359/267 |
| 8,724,229 B2* | 5/2014 | Takahashi | G02B 17/086 | 359/720 |
| 9,213,178 B1* | 12/2015 | Giri | G02B 27/0172 | |
| 9,261,688 B2* | 2/2016 | Takeda | G02B 6/003 | |
| 9,345,402 B2* | 5/2016 | Gao | G02B 5/04 | |
| 9,366,869 B2* | 6/2016 | Martinez | G02B 27/0172 | |
| 9,395,544 B2* | 7/2016 | Luttmann | G02B 27/0172 | |
| 9,625,723 B2* | 4/2017 | Lou | G06F 3/013 | |
| 9,874,760 B2* | 1/2018 | Hua | G02B 30/22 | |
| 9,910,284 B1* | 3/2018 | Nortrup | G02B 27/0172 | |
| 9,915,823 B1* | 3/2018 | Kress | G02B 27/0172 | |
| 9,977,246 B2* | 5/2018 | Ouderkirk | G02B 6/0056 | |
| 10,228,561 B2* | 3/2019 | Robbins | G02B 27/0172 | |
| 10,509,228 B1* | 12/2019 | Sulai | G02B 27/0172 | |
| 10,534,185 B1* | 1/2020 | Lee | G06F 3/013 | |
| 10,782,453 B2* | 9/2020 | Benitez | G02B 27/0172 | |
| 10,989,923 B2* | 4/2021 | Arora | G02B 27/0172 | |
| 11,308,695 B2* | 4/2022 | Lan | G02B 27/0172 | |
| 11,500,143 B2* | 11/2022 | Danziger | G02C 7/061 | |
| 2002/0015114 A1* | 2/2002 | Okuyama | G02B 27/0172 | 349/137 |
| 2002/0018185 A1* | 2/2002 | Kuramochi | G03B 13/08 | 353/69 |
| 2002/0034016 A1* | 3/2002 | Inoguchi | G03B 21/10 | 359/632 |
| 2002/0039232 A1* | 4/2002 | Takeyama | G02B 27/4277 | 359/566 |
| 2002/0041446 A1* | 4/2002 | Nagaoka | G02B 27/0172 | 359/633 |
| 2002/0060850 A1* | 5/2002 | Takeyama | G02B 27/0172 | 359/639 |
| 2003/0034935 A1* | 2/2003 | Amanai | G02B 17/08 | 359/833 |
| 2003/0107816 A1* | 6/2003 | Takagi | G02B 17/004 | 359/631 |
| 2003/0197943 A1* | 10/2003 | Yamazaki | G02B 17/086 | 359/631 |
| 2005/0254107 A1* | 11/2005 | Amanai | G02B 17/0832 | 359/853 |
| 2007/0064310 A1* | 3/2007 | Mukawa | G02B 17/086 | 348/E5.145 |
| 2008/0239422 A1* | 10/2008 | Noda | G02B 27/0172 | 359/13 |
| 2010/0290127 A1* | 11/2010 | Kessler | G02B 27/0172 | 359/631 |
| 2011/0102874 A1* | 5/2011 | Sugiyama | G02B 27/0172 | 359/205.1 |
| 2011/0175799 A1* | 7/2011 | Yamada | G02C 7/086 | 345/8 |
| 2011/0194163 A1* | 8/2011 | Shimizu | G02B 27/0172 | 359/15 |
| 2012/0081800 A1* | 4/2012 | Cheng | G03B 21/00 | 359/720 |
| 2012/0162549 A1* | 6/2012 | Gao | G02B 6/003 | 359/651 |
| 2013/0077175 A1* | 3/2013 | Hotta | G02B 3/08 | 359/630 |
| 2014/0071539 A1* | 3/2014 | Gao | G02B 27/0172 | 359/737 |
| 2014/0160576 A1* | 6/2014 | Robbins | G02B 27/0172 | 359/630 |
| 2014/0240843 A1* | 8/2014 | Kollin | G02B 5/30 | 359/633 |
| 2014/0361957 A1* | 12/2014 | Hua | G02B 27/0172 | 345/8 |
| 2015/0061975 A1* | 3/2015 | Komatsu | G02B 27/0172 | 345/8 |
| 2015/0153575 A1* | 6/2015 | Komatsu | G02B 27/0172 | 345/8 |
| 2015/0185480 A1* | 7/2015 | Ouderkirk | G02B 27/283 | 359/581 |
| 2015/0205130 A1* | 7/2015 | Border | G02B 27/144 | 359/630 |
| 2015/0219898 A1* | 8/2015 | Ko | G02B 27/0172 | 359/630 |
| 2016/0062121 A1* | 3/2016 | Border | G02B 27/0176 | 359/630 |
| 2016/0085071 A1* | 3/2016 | Border | G02B 27/145 | 359/638 |
| 2016/0109713 A1* | 4/2016 | Osterhout | G02B 27/0172 | 359/630 |
| 2016/0139411 A1* | 5/2016 | Kang | A61B 3/12 | 359/630 |
| 2016/0147070 A1* | 5/2016 | Border | G06F 3/017 | 359/633 |
| 2016/0154245 A1* | 6/2016 | Gao | G02B 27/283 | 359/630 |
| 2016/0231577 A1* | 8/2016 | Mack | G02B 27/0172 | |
| 2017/0045746 A1* | 2/2017 | Ellsworth | G02B 27/0176 | |
| 2017/0108697 A1* | 4/2017 | El-Ghoroury | G02B 27/0081 | |
| 2017/0180685 A1* | 6/2017 | Takagi | G02B 27/0172 | |
| 2017/0184854 A1* | 6/2017 | Takagi | G02B 27/0172 | |
| 2017/0276918 A1* | 9/2017 | Hua | G02B 17/08 | |
| 2017/0285347 A1* | 10/2017 | Cai | G02B 27/0172 | |
| 2017/0293143 A1* | 10/2017 | Martinez | G02B 27/0172 | |
| 2017/0293144 A1* | 10/2017 | Cakmakci | G02B 27/017 | |
| 2017/0336636 A1* | 11/2017 | Amitai | G02B 27/0172 | |
| 2017/0363870 A1* | 12/2017 | Cakmakci | G02B 27/0172 | |
| 2018/0045949 A1* | 2/2018 | Hua | G02B 5/04 | |
| 2018/0067315 A1* | 3/2018 | Amitai | G02B 6/0035 | |
| 2018/0074323 A1* | 3/2018 | Wheelwright | G02B 3/08 | |
| 2018/0074324 A1* | 3/2018 | Wheelwright | G02C 7/02 | |
| 2018/0120579 A1* | 5/2018 | Gollier | G06F 3/012 | |
| 2018/0231778 A1* | 8/2018 | Yoon | G02B 3/08 | |
| 2018/0259777 A1* | 9/2018 | Uemura | G02B 27/0172 | |
| 2019/0025589 A1* | 1/2019 | Haddick | G06F 1/163 | |
| 2019/0072767 A1* | 3/2019 | Vallius | H04N 9/646 | |
| 2019/0179409 A1* | 6/2019 | Jones | G02B 27/0172 | |
| 2019/0278087 A1* | 9/2019 | Cheng | G02B 27/01 | |
| 2019/0313087 A1* | 10/2019 | Geng | H04N 13/344 | |
| 2020/0018966 A1* | 1/2020 | Komatsu | G02B 5/10 | |
| 2020/0018967 A1* | 1/2020 | Komatsu | G02B 27/283 | |
| 2020/0026087 A1* | 1/2020 | Cai | G02B 27/283 | |
| 2020/0096772 A1* | 3/2020 | Adema | G02B 6/0016 | |
| 2020/0183167 A1* | 6/2020 | Cheng | G02B 27/0172 | |
| 2020/0271936 A1* | 8/2020 | Leibovici | G03H 1/0244 | |
| 2020/0326543 A1* | 10/2020 | Kim | G06F 3/011 | |
| 2020/0393677 A1* | 12/2020 | Hua | G02B 13/0095 | |
| 2020/0393678 A1* | 12/2020 | Leuenberger | G02B 27/0172 | |
| 2021/0014473 A1* | 1/2021 | Hua | G02B 27/0172 | |
| 2021/0018955 A1* | 1/2021 | Ciou | G02B 17/0856 | |
| 2021/0033860 A1* | 2/2021 | Yamamoto | G02B 27/0081 | |
| 2021/0063636 A1* | 3/2021 | Shin | G02B 6/0028 | |
| 2021/0080729 A1* | 3/2021 | Ha | G02B 27/143 | |
| 2021/0132323 A1* | 5/2021 | Hudman | G02B 3/0081 | |
| 2021/0132400 A1* | 5/2021 | Ha | G02B 27/0172 | |
| 2021/0165216 A1* | 6/2021 | Takagi | G02B 27/0172 | |
| 2021/0181533 A1* | 6/2021 | Kim | G02B 27/0176 | |
| 2021/0199965 A1* | 7/2021 | Hwang | G02B 6/3512 | |
| 2021/0199978 A1* | 7/2021 | Hwang | G02B 27/0176 | |
| 2021/0208399 A1* | 7/2021 | Wei | G02B 27/0172 | |
| 2021/0209364 A1* | 7/2021 | Park | G06T 19/006 | |
| 2021/0231957 A1* | 7/2021 | Taketani | G02B 27/283 | |
| 2021/0333557 A1* | 10/2021 | Qin | G02B 27/0172 | |
| 2021/0341739 A1* | 11/2021 | Cakmakci | G02C 7/086 | |
| 2021/0341740 A1* | 11/2021 | Cakmakci | G02B 27/0025 | |
| 2021/0364798 A1* | 11/2021 | Dong | G02B 27/0172 | |
| 2022/0019085 A1* | 1/2022 | Osterhout | G06T 7/529 | |
| 2022/0035161 A1* | 2/2022 | Sinay | G02B 27/0172 | |
| 2022/0066222 A1* | 3/2022 | Qin | G02B 17/006 | |
| 2022/0082836 A1* | 3/2022 | Qin | G02B 27/1066 | |
| 2022/0163804 A1* | 5/2022 | Cakmakci | G03H 1/265 | |
| 2022/0229296 A1* | 7/2022 | Song | H01L 27/153 | |

(56) References Cited

U.S. PATENT DOCUMENTS

| | | | |
|---|---|---|---|
| 2022/0268970 A1* | 8/2022 | Cranton | G02B 3/10 |
| 2022/0269077 A1* | 8/2022 | Adema | G02B 27/0172 |
| 2022/0276490 A1* | 9/2022 | Wu | G02B 27/1066 |
| 2022/0276496 A1* | 9/2022 | Zhang | G02B 7/09 |
| 2022/0291508 A1* | 9/2022 | Ha | G02B 27/0172 |
| 2022/0317449 A1* | 10/2022 | Freeman | G02B 17/086 |
| 2022/0335692 A1* | 10/2022 | Chiu | G02B 27/017 |
| 2022/0397765 A1* | 12/2022 | Cakmakci | G02B 17/0856 |
| 2023/0023570 A1* | 1/2023 | Qin | G02B 27/0172 |
| 2023/0094153 A1* | 3/2023 | Almanza-Workman | G02B 27/0172, 351/159.74 |
| 2023/0176383 A1* | 6/2023 | Cakmakci | G02B 5/1833, 349/1 |
| 2023/0236423 A1* | 7/2023 | Martinez | G02B 27/0172, 359/630 |
| 2023/0258929 A1* | 8/2023 | Border | G02B 27/144, 345/8 |
| 2023/0333382 A1* | 10/2023 | Yun | G02B 30/10 |
| 2023/0367128 A1* | 11/2023 | Ha | G02B 27/0176 |
| 2023/0393326 A1* | 12/2023 | Aiki | G02B 3/005 |
| 2023/0393393 A1* | 12/2023 | Chen | G02B 27/0172 |
| 2023/0393398 A1* | 12/2023 | Oh | G02B 27/0172 |
| 2023/0393399 A1* | 12/2023 | Odom | G02B 27/0172 |
| 2023/0418065 A1* | 12/2023 | Sun | G02B 27/126 |
| 2024/0004199 A1* | 1/2024 | Glik | G02B 27/0172 |
| 2024/0004202 A1* | 1/2024 | Kim | G02B 27/0172 |
| 2024/0019699 A1* | 1/2024 | Sudoh | G02B 27/01 |
| 2024/0036342 A1* | 2/2024 | Ouderkirk | G02B 5/09 |
| 2024/0061246 A1* | 2/2024 | Huang | G02B 3/0043 |
| 2024/0061248 A1* | 2/2024 | Robinson | G02B 5/3083 |

* cited by examiner

ULTRA-THIN LENS, VIRTUAL IMAGE DISPLAY DEVICE USING SAME, AND NEAR-EYE DISPLAY

CROSS-REFERENCE TO RELATED APPLICATION

This application claims priority to Chinese Patent Application No. 202111674598.9 filed on Dec. 31, 2021, the disclosure of which is hereby incorporated by reference in its entirety.

BACKGROUND

With the characteristics of perfectly integrating real and virtual scenes, the AR technology has become a hot topic of research and discussion in recent years, and its scope of application is also extending accordingly, gradually permeating consumption, medical and health industry, industry, and various other fields. Optical see-through near-eye display technology is a core presentation method of augmented reality (AR).

SUMMARY

The present disclosure relates an ultra-thin lens, a virtual image display device using same, and a near-eye display, for augmented reality (AR) applications.

A technical problem to be resolved by some embodiments of the present disclosure is to provide an ultra-thin lens for realizing AR display.

Another technical problem to be resolved by some embodiments of the present disclosure is to provide a virtual image display device, including an ultra-thin lens, with additional micro-display panel, to achieve near-eye display of AR in an optical see-through manner.

Still another technical problem to be resolved by some embodiments of the present disclosure is to provide a near-eye display.

According to an aspect of embodiments of the present disclosure, an ultra-thin lens for AR is provided, including a primary lens (10), an intermediate lens (20), and a secondary lens (30), wherein:

the primary lens (10) includes at least three effective optical surfaces, where a first optical surface (106) is an incident surface, a second optical surface (102) is a surface close to a human eye side, and a third optical surface (103) is a surface close to an environmental side; and the primary lens receives image light from a micro-display panel that is transmitted into the primary lens with the first optical surface (106) as an incident surface, propagates in a direction of the third optical surface (103), and then undergoes total reflection at the third optical surface (103) and the second optical surface (102) in sequence, and the image light after total reflection by the second optical surface (102) is transmitted from the primary lens through the third optical surface and directed to the intermediate lens;

the intermediate lens (20) includes two effective optical surfaces: a fourth optical surface (104) and a fifth optical surface (105); and the fourth optical surface is provided adjacent to the third optical surface and has a predetermined gap therewith, the image light directed to the intermediate lens is transmitted into the intermediate lens through the fourth optical surface, and part of the image light is reflected by the fifth optical surface back to the intermediate lens, and then transmitted through the fourth optical surface, the third optical surface, and the second optical surface in sequence, to the human eye for imaging;

the secondary lens (30) is provided adjacent to the fifth optical surface, and environmental light is imaged to the human eye through the secondary lens, the intermediate lens, and the primary lens; and at least a surface of the primary lens and a surface of the secondary lens form a first outer surface (100A) of the ultra-thin lens toward an exit pupil side, and a surface of the primary lens, a surface of the intermediate lens, and a surface of the secondary lens jointly form a second outer surface (100B) of the ultra-thin lens toward the environmental side.

In some embodiments, an incident angle of the image light first directed to the third optical surface (103) satisfies a total reflection condition inside the primary lens (10); and an incident angle of the image light first directed from the third optical surface to the second optical surface (102) satisfies the total reflection condition inside the primary lens (10).

In some embodiments, surface types of the first optical surface, the second optical surface, and the third optical surface are respectively one of a free-form surface, a spherical surface, or an aspherical surface.

In some embodiments, the fourth optical surface and the third optical surface have the same surface type, and a distance between the fourth optical surface and the third optical surface does not exceed 1 mm.

In some embodiments, the fifth optical surface has a surface type being one of a free-form surface, a spherical surface, or an aspherical surface, and the fifth optical surface is coated with a reflective film having a predetermined transmission-reflection ratio.

In some embodiments, the secondary lens includes two effective optical surfaces: a sixth optical surface (107) and a seventh optical surface (108), the sixth optical surface and the fifth optical surface have the same surface type and are adhered, and the seventh optical surface has a surface type similar to a surface type of the second optical surface.

In some embodiments, the primary lens further includes a first surface (15) and a second surface (16) provided opposite to each other;

the intermediate lens further includes a third surface (23);

the secondary lens further includes a fourth surface (34) and a fifth surface (35) provided opposite to each other;

the first outer surface (100A) consists of the first surface and the second optical surface of the primary lens and the fourth surface of the secondary lens; and the second outer surface (100B) consists of the second surface of the primary lens, the third surface of the intermediate lens, and the fifth surface of the secondary lens.

In some embodiments, the first surface, the fourth surface, and the second optical surface have the same surface type; or the first surface, the fourth surface, and the second optical surface have different surface types, have smooth transitions therebetween, or have spliced regions with abrupt curvature; and the second surface, the fifth surface, and the third surface have the same surface type; or the second surface, the fifth surface, and the third surface have different surface types, have smooth transitions therebetween, or have spliced regions with abrupt curvature.

According to another aspect of the embodiments of the present disclosure, a virtual image display device employing the ultra-thin lens is provided, further including a micro-display panel as an image source, where the image source is provided facing the first optical surface, and image light emitted by the micro-display panel is directed to the first optical surface of the primary lens.

In some embodiments, a flexible surround is further included to enclose edges of the secondary lens, the intermediate lens, and the primary lens in close proximity, so as to enable the entire lens to be sealed.

According to another aspect of the embodiments of the present disclosure, a near-eye display is provided. The near-eye display may be constructed in a form of eyeglasses due to the thinness and lightness of the lens of the present disclosure, and includes the virtual image display device described above placed in a lens position of the eyeglasses and a main board and a battery placed in legs of the eyeglasses.

According to the ultra-thin lens provided in the present disclosure, the total reflection and light splitting functions of image light inside the lens are realized respectively through the primary lens and the intermediate lens, resulting in an increase in a quantity of total reflections inside the primary lens and a decrease in design limitations of a plurality of optical surfaces, so that the entire lens has a thin and light profile. The ultra-thin lens for AR has an extremely similar appearance to ordinary corrective lenses, and has good optical performance to meet AR display requirements, allowing the lens to be worn like ordinary glasses.

DETAILED DESCRIPTION

Figure 1:
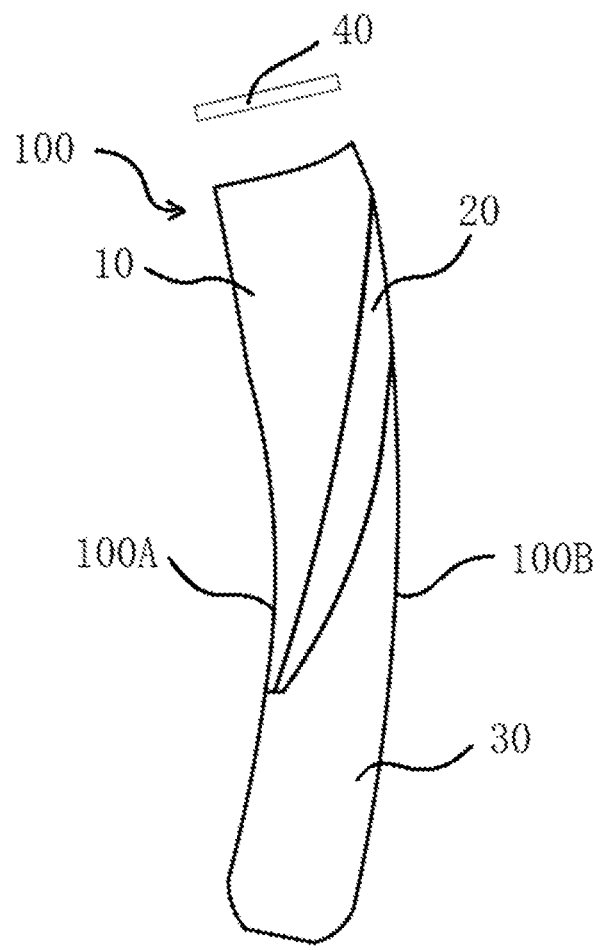
FIG. 1 is a cross-sectional view of a virtual image display device according to some embodiments of the present disclosure.

Exemplary embodiments of the present disclosure are described in detail below to illustrate the present disclosure. Examples are shown in the accompanying drawings, and the same components are denoted by the same reference numerals. Unless otherwise explicitly stated, a person skilled in the art may understand that terms such as "before" and "after" are merely used for relative description, but are not intended to absolutely limit actual sequence of preceding or following. Terms such as "first" and "second" are to merely understood as distinguishing different components, but are not intended to limit the sequence. In addition, in different embodiments, the parts all referred to as a first part may have different component structures.

In some near-eye display optical solutions, the need to combine compactness and see-through display usually requires that light propagates in the form of total reflection inside an optical element and merges with a see-through optical path at the near eye. Typical design methods include curved lens/prism solutions and waveguide display solutions. In the free-form prism solutions, the primary prism performs all or most of the imaging function, so that no or only a simple set of prepositioned lenses is needed for correcting aberrations. However, due to the form factor and light propagation requirements, most solutions are difficult to combine thinness, large field of view, and large eye box, and the form factor of device still differs significantly from those of ordinary glasses. In the waveguide display solutions, in order to make the lens thinner, the waveguide as the primary lens undertakes only a small amount or even no imaging function. Therefore, it needs to be combined with a more complex prepositioned imaging system. In general, although the waveguide at the near eye has a thin and light form, the prepositioned imaging system of the waveguide display solutions still needs to occupy a non-negligible space. For this reason, a new AR optical solution still needs to be provided to make optical systems lighter and thinner.

First Embodiment

As shown in FIG. 1, an ultra-thin lens and a virtual image display device 100 composed thereof according to the present disclosure mainly include a primary lens 10, an intermediate lens 20, a secondary lens 30, and a micro-display panel 40. According to actual processing requirements and performance requirements, materials of the primary lens 10, the intermediate lens 20, and the secondary lens 30 in some embodiments can be optical glass materials, optical resin materials, or other optical materials. The micro-display panel 40 according to some embodiments can be a micro organic light-emitting diode (micro-OLED), a micro-light-emitting diode (micro-LED), an liquid crystal on silicon (LCoS), a micro liquid crystal display (micro LCD), a backlit LCD, or a digital light processing (DLP) display, or the like.

In the first embodiment of the present disclosure shown in FIG. 1, a structure of the ultra-thin lens is described with reference to the human eye position as the front. The primary lens 10 is provided on a front side of the intermediate lens 20, and the secondary lens 30 is close to a rear side of the intermediate lens 20. In this way, the primary lens 10, the intermediate lens 20, and the secondary lens 30 form the ultra-thin lens, and outer surfaces of different lenses respectively form two outer surfaces 100A and 100B of the ultra-thin lens. The outer surface 100A as a whole maintains a generally consistent orientation, and the outer surface 100B as a whole maintains a generally consistent orientation. The shape of the ultra-thin lens can be a flat shape with an arc-shaped outer surface, and can finally be cut into a circle, an ellipse, or other shapes centered on a visual axis, but without limitation, a person skilled in the art may understand that the final shape of the ultra-thin lens can be determined by a frame.

Figure 2:
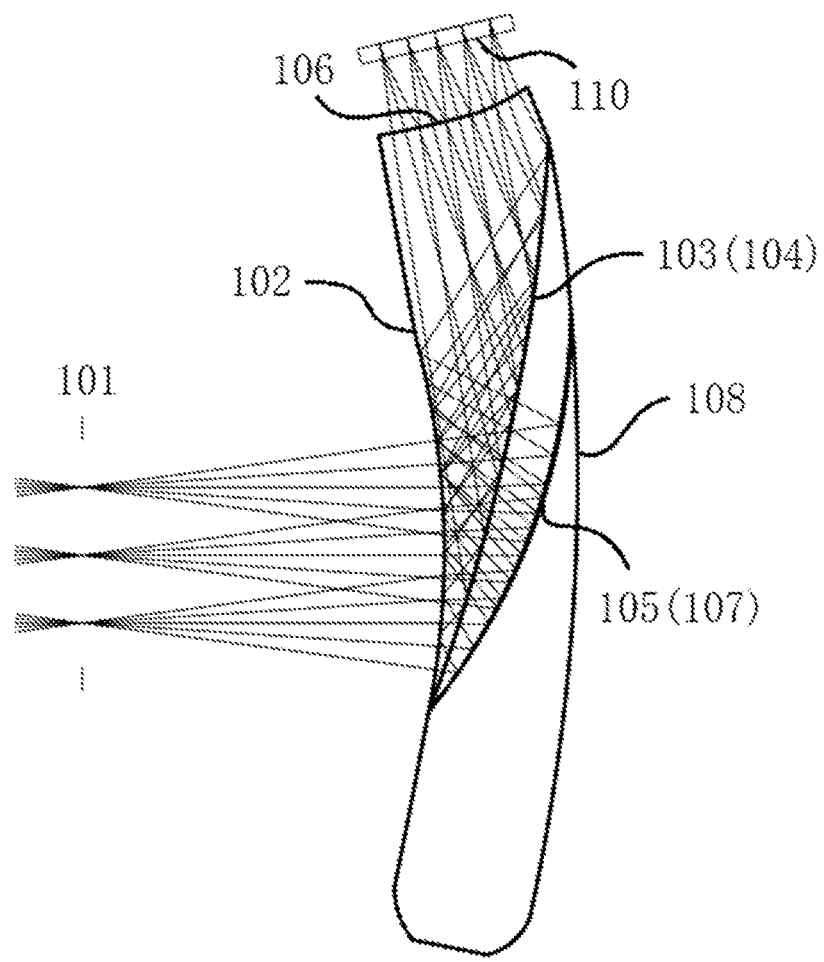
FIG. 2 is an optical path light diagram of virtual magnification display of image light by an ultra-thin lens according to some embodiments of the present disclosure.

As shown in FIG. 2, in the virtual image display device, the primary lens 10 includes at least three effective optical surfaces: a first optical surface 106, a second optical surface 102, and a third optical surface 103. The first optical surface 106 is an incident surface. The first optical surface 106 is concave or convex facing the micro-display panel 40. A surface type of the first optical surface 106 may be any one of a spherical surface, an aspherical surface, or a free-form surface. The second optical surface 102 is facing the human eye side. The third optical surface 103 is provided facing the environment side. Surface types of the second optical surface 102 and the third optical surface 103 each may be any one of a spherical surface, an aspherical surface, or a free-form surface. The primary lens 10 receives image light from the micro-display panel 40, which is transmitted into the primary lens 10 with the first optical surface 106 as an incident surface, propagates in a direction of the third optical surface 103, and then undergoes total reflection at the third optical surface 103 and the second optical surface 102 in sequence, and the image light after total reflection by the second optical surface 102 is transmitted from the primary lens 10 through the third optical surface 103 and directed to the intermediate lens 20.

In the foregoing process, an incident angle at which the image light first reaches the third optical surface 103 and an incident angle at which the image light first reaches the second optical surface 102 satisfy a total reflection condition. That is, the incident angle of the image light from the micro-display panel 40 to the third optical surface 103 is greater than a total reflection critical angle of the material used for the primary lens 10, so that the image light satisfies the total reflection condition when it first reaches the third optical surface 103. Similarly, the incident angle at which the image light is first directed from the third optical surface 103 to the second optical surface 102 is greater than the total reflection critical angle of the material used for the primary lens 10, so that the image light satisfies the total reflection condition when it first reaches the second optical surface 102.

The intermediate lens 20 is provided in a light exit direction on a side of the third optical surface of the primary lens 10, and the intermediate lens 20 extends in a direction perpendicular to an optical axis to cover an effective light-transmitting aperture range of the light transmitted from the third optical surface 103.

The intermediate lens 20 includes at least two effective optical surfaces: a fourth optical surface 104 and a fifth optical surface 105. Surface types of the fourth optical surface 104 and the fifth optical surface 105 each may be any one of a spherical surface, an aspherical surface, or a free-form surface. The fourth optical surface 104 is provided adjacent to the third optical surface 103 and has a predetermined gap therewith, to ensure a total reflection effect of the image light at the third optical surface 103 inside the primary lens 10. The fourth optical surface 104 and the third optical surface 103 have the same surface type. In some embodiments, a distance between the fourth optical surface 104 and the third optical surface 103 does not exceed 1 mm. The fifth optical surface 105 is coated with a reflective coating having a predetermined transmission-reflection ratio, such as a half-mirror coating or a beam-splitting coating with another transmission-reflection ratio. A transmission-reflection ratio of the spectroscopic coating may be selected according to luminous brightness of the micro-display panel, to ensure that the image light of the micro-display panel is utilized as effectively as possible and is balanced with intensity of subsequent external environmental light to obtain a good contrast of an AR image.

The image light directed to the intermediate lens 20 from the primary lens 10 is transmitted into the intermediate lens 20 through the fourth optical surface 104. Part of the image light is reflected by the fifth optical surface 105 back to the intermediate lens 20, and then transmitted through the fourth optical surface 104, the third optical surface 103, and the second optical surface 102 in sequence, to the human eye for imaging.

When the image light leaves the second optical surface 102 and is directed to the third optical surface 103, an incident angle at which the image light reaches the third optical surface 103 for the second time does not satisfy the total reflection condition, and the image light is transmitted. After being transmitted from the primary lens 10, the image light enters the intermediate lens 20 through the fourth optical surface 104, and reaches the fifth optical surface 105. Part of the image light is reflected by the fifth optical surface 105 and then transmitted toward the human eye in a propagation direction parallel to the direction of the visual axis.

When the image light is transmitted from the fifth optical surface 105 to the human eye, refraction occurs on the fourth optical surface 104, the third optical surface 103, and the second optical surface 102. The light transmitted from a single field of view represented on a display screen 110 of the micro-display panel 40 is finally distributed within an eye box range in a state of parallel light or approximately parallel light. When moving within the eye box, the human eye can observe a virtual image formed by a micro display panel at a more distant position.

The primary lens 10 and the intermediate lens 20 are used as primary optical elements for imaging (enlarging the virtual image) of the micro-display panel 40, and the curvature of each optical surface of the primary lens 10 and the intermediate lens 20 is utilized to provide a predetermined optical power, to enlarge an image displayed on the micro-display panel, so that the image light of the micro-display panel is magnified and projected to a distance. The image from the micro-display panel seen at the human eye appears to be transmitted from a few meters away from the eye rather than from a very close place (where the micro-display panel is actually located).

In the foregoing image light transmission process, the image light undergoes two total reflections in the primary lens 10, then enters the secondary lens 20 and is reflected and divided by the fifth optical surface 105, and propagates in a direction toward the human eye. The image light forms no intermediate image within the ultra-thin lens.

According to the embodiments with the ultra-thin lens, the total reflections inside the lens are realized through the primary lens 10, and light splitting function of the image light inside the lens is realized through the intermediate lens 20, resulting in an increase (more than once) in a quantity of total reflections inside the primary lens 10 and a decrease in design limitations of a plurality of optical surfaces, so that the entire lens has a thin and light profile. When the field of view ranges from 30 to 40 degrees, the overall thickness of the lens (especially in the direction of the visual axis) can be as thin as 8 mm or less. When parameters such as the field of view are increased, the thickness of the lens is increased to a certain extent.

In this embodiment, in order to implement AR display, the ultra-thin lens further includes the secondary lens 30. The secondary lens 30 is provided adjacent to the fifth optical surface 105 of the intermediate lens 20. The secondary lens 30 is not used for imaging the virtual image light. The secondary lens 30 includes at least two optical surfaces: a sixth optical surface 107 facing the human eye side and a seventh optical surface 108 facing the environmental side. The sixth optical surface 107 and the fifth optical surface 105 have the same surface type and are glued and fixed. The seventh optical surface 108 is facing the environmental side, and a surface type of the seventh optical surface 108 is similar to that of the second optical surface 102, so as to control a refraction state of the environmental light, so that the external parallel light still maintains original parallelism and direction into the human eye after passing through the system. The environmental light enters the secondary lens 30 through the seventh optical surface 108 and is then directed to the human eye for imaging, after passing through the secondary lens 30, the intermediate lens 20, and the primary lens 10.

The seventh optical surface 108 of the secondary lens 30 and the second optical surface 102 of the primary lens are respectively two outer side surfaces of the ultra-thin lens that correspond to a light-transmitting aperture region at an exit pupil position of the human eye. In order to avoid light deflection caused by each lens to the environmental light as much as possible, the seventh optical surface 108 of the secondary lens 30 should have a similar surface type to the second optical surface 102. Finally, when entering the eye box after passing through the secondary lens 30, the intermediate lens 20, and the primary lens 10, the parallel light from the external real environment still maintains or approximately maintains the direction, the aperture, and the parallelism before the incident.

As shown in FIG. 1, the ultra-thin lens 100 has a first outer surface 100A towards an exit pupil side, and a second outer surface 100B towards the environment side. The first outer surface 100A of the ultra-thin lens 100 toward the exit pupil side is formed by at least a surface of the primary lens 10 and a surface of the secondary lens 30. The second outer surface 100B of the ultra-thin lens 100 toward the environmental side is jointly formed by a surface of the primary lens 10, a surface of the intermediate lens 20, and a surface of the secondary lens 30. The first outer surface 100A and the second outer surface 100B are each formed as a spherical surface, an aspherical surface, a free-form surface, or other surface types.

Figure 3A:
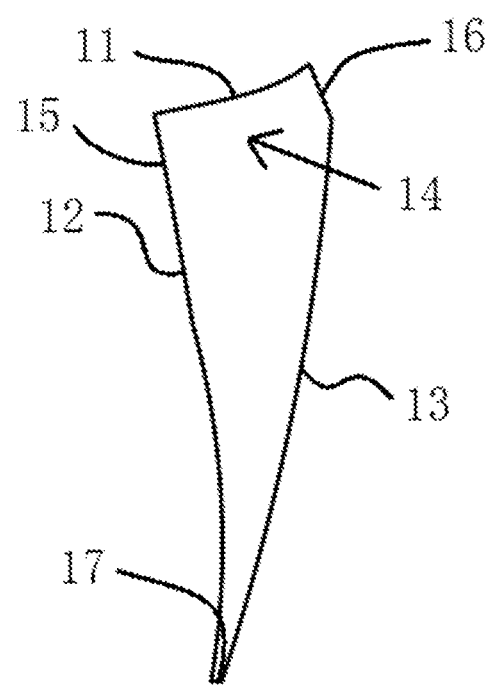
FIG. 3A is a cross-sectional view of a primary lens according to some embodiments of the present disclosure.
Figure 3B:
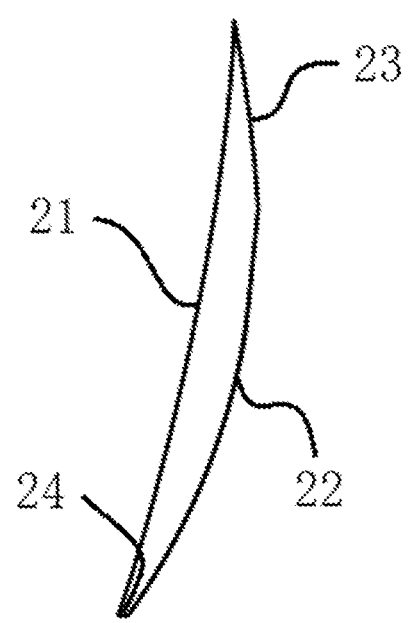
FIG. 3B is a cross-sectional view of an intermediate lens according to some embodiments of the present disclosure.
Figure 3C:
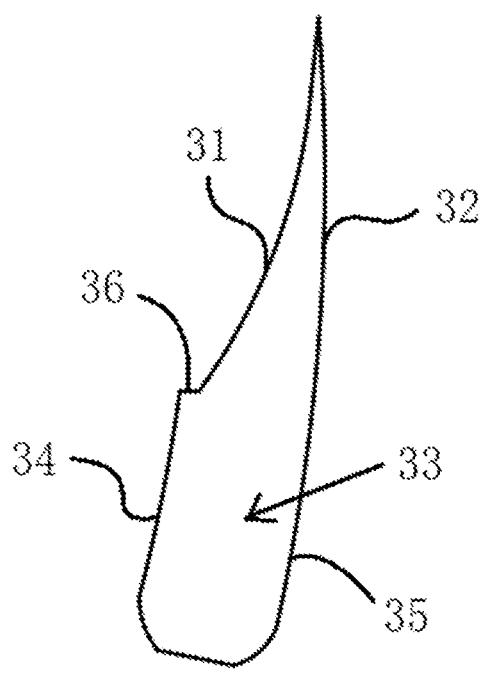
FIG. 3C is a cross sectional view of a secondary lens according to some embodiments of the present disclosure.

FIG. 3A, FIG. 3B, and FIG. 3C respectively show the structures of the primary lens 10, the intermediate lens 20, and the secondary lens 30. The following describes the structures of the primary lens 10, the intermediate lens 20, and the secondary lens 30 with reference to FIG. 3A to FIG. 3C by using an example in which the micro-display panel 40 is located above the primary lens 10.

As shown in FIG. 3A, the primary lens 10 has at least three optical surfaces, an upper surface 11 of the primary lens 10 is the first optical surface 106, a surface 12 on its lower side facing the human eye side is the second optical surface 102, and a surface 13 facing the environmental side is the third optical surface 103. A first surface 15 and a second surface 16 are provided opposite to each other at an upper end 14 of the primary lens 10. In this embodiment, a lower surface 17 is also provided at the lower end of the primary lens 10. Two sides of the lower surface 17 are respectively connected to lower ends of the second optical surface 102 and the third optical surface 103.

As shown in FIG. 3B, the intermediate lens 20 has at least three surfaces. A surface 21 facing the human eye side is the fourth optical surface 104. A surface 22 facing the environmental side is the fifth optical surface 105. A third surface 23 facing the environmental side is further included. The third surface 23 is connected to upper ends of the fourth optical surface 104 and the fifth optical surface 105. In this embodiment, a lower surface 24 is further provided at a lower end of the intermediate lens 20, and two sides of the lower surface 24 are respectively connected to lower ends of the fourth optical surface 104 and the fifth optical surface 105.

As shown in FIG. 3C, the secondary lens 30 has at least two optical surfaces. At an upper end, a surface 31 facing the human eye side is the sixth optical surface 107, and a surface 32 facing the environmental side is the seventh optical surface 108. A fourth surface 34 and a fifth surface 35 are provided opposite to each other at a lower end 33 of the secondary lens 30. In this embodiment, the secondary lens 30 further includes an intermediate surface 36 provided between the fourth surface 34 and the sixth optical surface 107 (that is, the surface 31). The intermediate surface 36 forms a platform for placing the lower end of the primary lens 10 and the lower end of the intermediate lens 20, and is in contact with the lower surface 17 of the primary lens 10 and the lower surface 24 of the intermediate lens 20, thereby forming an ultra-thin lens including the primary lens 10, the intermediate lens 20, and the secondary lens 30 in one piece.

Figure 4:
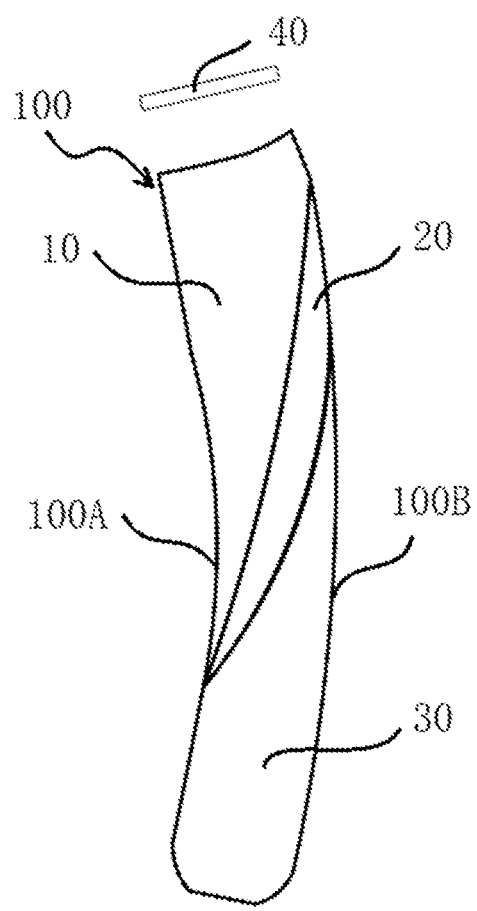
FIG. 4 is a cross-sectional view of a virtual image display device according to some embodiments of the present disclosure.

In another embodiment shown in FIG. 4, the lower end of the primary lens 10 is a tip formed by the second optical surface 102 and the third optical surface 103, and the lower end of the intermediate lens 20 is also a tip formed by the fourth optical surface 104 and the fifth optical surface 105. When the primary lens 10, the intermediate lens 20, and the secondary lens 30 are combined, there is no direct contact between the primary lens 10 and the secondary lens 30, and the primary lens 10 and the secondary lens 30 are respectively provided adjacent to two side surfaces of the intermediate lens 20.

In the foregoing two embodiments, the first outer surface 100A consists of the first surface 15 and the second optical surface 102 of the primary lens 10 and the fourth surface 34 of the secondary lens 30; and the second outer surface 100B consists of the second surface 16 of the primary lens 10, the third surface 23 of the intermediate lens 20, and the fifth surface 35 of the secondary lens 30.

In an embodiment, in the first outer surface 100A, a surface type of a region of the first outer surface 100A corresponding to a light-transmitting aperture of the image light is determined by the surface type of the second optical surface 102. The first surface 15 and the fourth surface 34 have the same surface type as the second optical surface 102. Or the first surface 15, the fourth surface 34, and the second optical surface 102 have similar surface types, with smooth transitions to each other. In the second outer surface 100B, the second surface 16 and the fifth surface 35 each have the same surface type as the third surface 23; or the second surface 16 and the fifth surface 35 each have a similar surface type to the third surface 23, with smooth transitions to each other. The surface types of the first outer surface 100A and the second outer surface 100B each may be any one of a spherical surface, an aspherical surface, or a free-form surface.

In other embodiments, the first outer surface 100A and the second outer surface 100B may alternatively be formed by spliced curved surfaces with different surface types, and there may be a smooth transition at a spliced position of the curved surfaces, or there may be spliced regions with abrupt curvature to form protruding spliced seams. This is not limited herein.

In the ultra-thin lens, the first outer surface 100A and the second outer surface 100B have a similar surface type, to achieve a see-through effect of the environmental light without optical power. A surface type of an optical effective region (that is, the seventh optical surface 108) on the outer surface of the secondary lens 30 facing the environmental side is similar to that of an optical effective region (that is, the second optical surface 102) on a near-eye surface of the primary lens 10, so as to control a refraction state of the light, so that the external parallel light still maintains original parallelism and an original direction into the human eye after passing through the system. In some embodiments, according to design requirements, the first outer surface 100A and the second outer surface 100B can form a surface difference to have a predetermined diopter to a user.

The first outer surface 100A and the second outer surface 100B each have a surface type according to some embodiments selected from a spherical surface, an aspherical surface, or a free-form surface, and in particular, a free-form surface or a discontinuous, segmented, and spliced spherical surface and aspherical surface may be used. The profile of the ultra-thin lens is similar to that of an ordinary diopter-correcting spectacle lens. For example, a diameter is approximately 70 mm. With such an arrangement, the ultra-thin lens of the present disclosure can be easily applied to a cutting tool of the corrective spectacle lenses, making it more easily adapted to different shapes of eyeglass frames.

Second Embodiment

In this embodiment, that the optical surfaces of the primary lens 10 and the intermediate lens 20 are each a free-form surface is used as an example to describe main design parameters in the entire ultra-thin lens. The position of the human eye is used as an origin, the direction of the visual axis is used as a Z-axis, an upward direction perpendicular to the Z-axis direction is used as a Y-axis, and a direction perpendicular to a Y-Z plane is used as an X-axis, to establish a coordinate system. Table 1 shows surface type parameters of the optical surfaces. Table 2 shows coefficients for a plurality of surfaces with surface types being free-form surfaces.

TABLE 1

Optical surface parameters of the primary lens and the intermediate lens in the second embodiment

| Surface marking | Surface type | Radius | X decentration | Y decentration | Z decentration | Alpha tilt |
| --- | --- | --- | --- | --- | --- | --- |
| 101 (stop) | Spherical surface | Infinite | 0 | 0 | 0 | 0 |
| 102 | XY polynomial | −99.61 | 0 | 0.000 | 16.000 | −0.466 |
| 103 | XY polynomial | −156.71 | 0 | 1.452 | 18.069 | −14.342 |
| 105 | XY polynomial | −27.19 | 0 | 0.593 | 19.800 | −21.119 |
| 106 | XY polynomial | −10.17 | 0 | 20.163 | 18.626 | −62.600 |
| 110 (display) | Spherical surface | Infinite | 0 | 22.486 | 14.971 | −75.930 |

TABLE 2

Coefficients in a surface type equation for a plurality of free-form surfaces

| | Parameter item | Surface 102 | Surface 103 | Surface 105 | Surface 106 |
| --- | --- | --- | --- | --- | --- |
|  | K | 1.976 | 30.000 | −0.557 | 0.239 |
| C4 | $X^2$ | −0.015 | −0.004 | −0.002 | 0.053 |
| C6 | $Y^2$ | −0.007 | −0.002 | 0.002 | −0.032 |
| C8 | $X^2Y$ | 0 | 2.190e−04 | −5.793e−05 | −0.004 |
| C10 | $Y^3$ | 0 | 1.549e−05 | −5.659e−05 | −0.008 |
| C11 | $X^4$ | 4.486e−05 | 1.902e−05 | 9.264e−06 | 0 |
| C13 | $X^2Y^2$ | −8.627e−05 | −2.537e−05 | −3.561e−05 | −8.795e−05 |
| C15 | $Y^4$ | −9.203e−06 | −2.872e−07 | −3.669e−06 | 0 |
| C17 | $X^4Y$ | 0 | 1.368e−06 | −1.582e−06 | 0 |
| C19 | $X^2Y^3$ | 0 | 3.822e−07 | 1.532e−06 | 0 |
| C21 | $Y^5$ | 0 | −2.665e−08 | 1.658e−07 | 0 |
| C22 | $X^6$ | 0 | −1.270e−08 | 1.762e−08 | 0 |
| C24 | $X^4Y^2$ | 0 | 3.905e−08 | 2.859e−08 | 0 |
| C26 | $X^2Y^4$ | 0 | −1.035e−08 | −6.384e−08 | 0 |
| C28 | $X^6$ | 0 | 1.773e−11 | −2.815e−08 | 0 |

The surface type of the free-form surface may be described in a form of an XY polynomial, and the equation is as follows:

$$z = \frac{c(x^2 + y^2)}{1 + sqrt(1 - (1+k)c^2(x^2 + y^2))} + \sum_{j=2}^{66} C_j x^m y^n;$$

have the same surface type. The fourth optical surface 204 and the third optical surface 203 have the same parameters.

The position of the human eye is used as an origin, the direction of the visual axis is used as a Z-axis, an upward direction perpendicular to the Z-axis direction is used as a Y-axis, and a direction perpendicular to a Y-Z plane is used as an X-axis, to establish a coordinate system. The optical surface parameters according to the third embodiment of the present disclosure may be shown in the following Table 3:

TABLE 3

Optical surface parameters of the primary lens and the intermediate lens in the third embodiment

| Surface number | Surface type | Radius | X decentration | Y decentration | Z decentration | Alpha tilt |
|---|---|---|---|---|---|---|
| stop (201) | Spherical surface | Infinite | 0 | 0 | 0 | 0 |
| 202 | Spherical surface | −100.00 | 0.00 | 0.00 | 16.00 | 0.00 |
| 203 | Spherical surface | −300.00 | 0.00 | 1.51 | 18.46 | −15.00 |
| 205 | Spherical surface | −42.79 | 0.00 | −0.02 | 20.00 | −22.75 |
| 206 | Spherical surface | 22.80 | 0.00 | 17.95 | 18.46 | −73.59 |
| 210 (display) | Spherical surface | Infinite | 0.00 | 22.18 | 17.87 | −68.19 |

For values of the coefficients in the polynomial equation corresponding to the first optical surface 106, the second optical surface 102, the third optical surface 103, and the fifth optical surface 105, refer to Table 2. The fourth optical surface 104 and the third optical surface 103 have the same surface type and the same relevant parameters.

To achieve thinness and lightness, the ultra-thin lens has a center thickness of 7.5 mm, a field of view of 32°, an eye box size of 10 mm×6 mm, and an exit pupil distance of 16 mm. In this case, the ultra-thin lens can be used for AR display. It may be understood that, when the secondary lens 30 is omitted, and a total reflection film is processed on the fifth optical surface 105 of the intermediate lens 20, a module thickness may be further reduced to 7.2 mm, and the lens can be used for VR display.

Third Embodiment

In the third embodiment, optical surfaces of a primary lens 10 and an intermediate lens 20 each have a surface type of a rotationally symmetrical spherical surface, so as to reduce the difficulty of processing.

Figure 5:
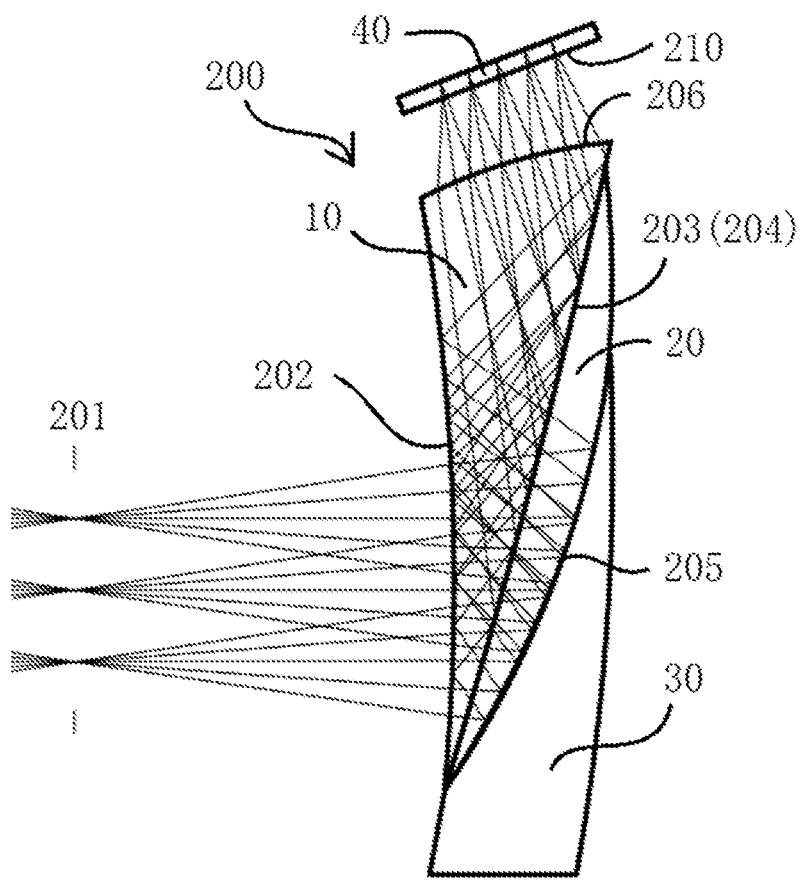
FIG. 5 is a cross-sectional view of a virtual image display device according to some embodiments of the present disclosure.

As shown in FIG. 5, an ultra-thin lens and a virtual image display device 200 composed thereof provided in this embodiment mainly include a primary lens 10, an intermediate lens 20, a secondary lens 30, and a micro-display panel 40. Structures of the primary lens 10, the intermediate lens 20, and the secondary lens 30 are similar to the structures in the first embodiment. A difference lies in that each optical surface has a spherical surface type, and a material may be optical glass. Corresponding to the first embodiment, along the image light transmission path from the human eye side to a display side, surfaces passed through are: a stop 201, a second optical surface 202, a third optical surface 203, a fourth optical surface 204, a fifth optical surface 205, a first optical surface 206, and a display surface 210. Example radius, and coordinate data thereof are shown in Table 2. The fourth optical surface 204 and the third optical surface 203

To achieve thinness and lightness, the entire ultra-thin lens has a thickness of 7.8 mm, a field of view of 32°, an entire eye box size of 10 mm×6 mm, and an exit pupil distance of 16 mm. The ultra-thin lens can be used for AR display, as shown in FIG. 5. It may be understood that, when the secondary lens is omitted, and a total reflection film is processed on the fifth optical surface 205 of the intermediate lens 20, a module thickness may be further reduced to 7.4 mm, and the lens can be used for VR display.

Fourth Embodiment

In this embodiment, according to a light and thin near-eye display module of the present disclosure, based on a primary lens 10, an intermediate lens 20, and a secondary lens 30, an additional optical lens may further be introduced to correct aberrations and improve display indicators. For example, a lens or a prism is provided between a micro-display panel 40 and the primary lens 10. The lens may be one or more of a single lens, a positive-negative glued lens, or a lens group. The prism may be a free-form prism.

Figure 6:
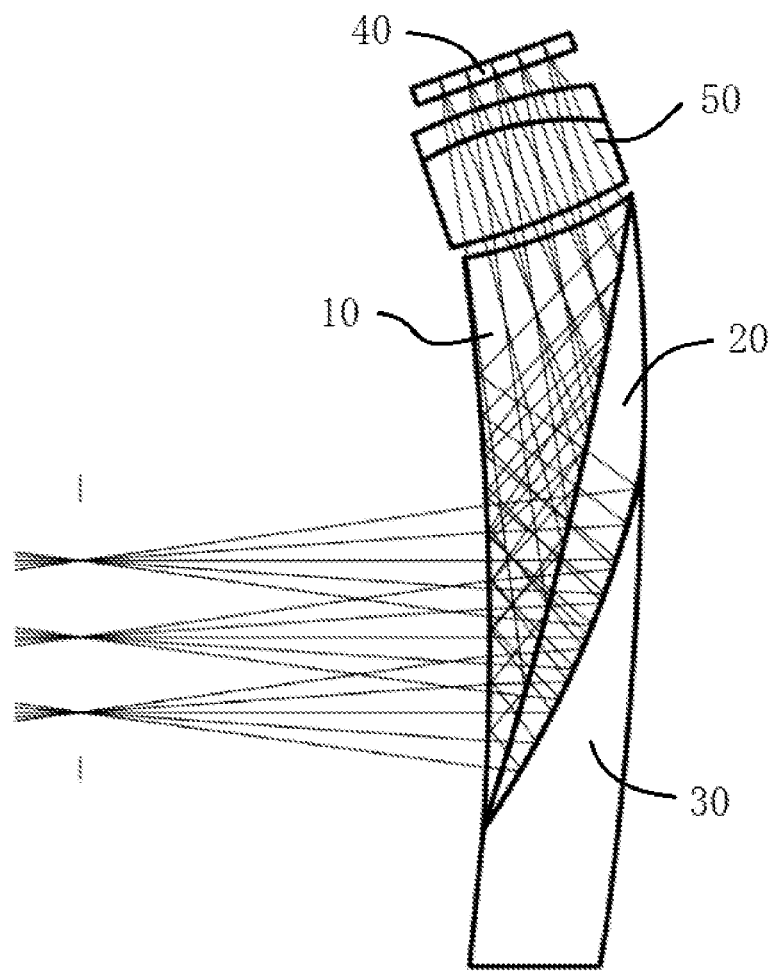
FIG. 6 is a cross-sectional view of a virtual image display device according to some embodiments of the present disclosure.

In some embodiments, a double-glued lens group 50 may be added between the primary lens 10 and the micro-display panel 40, and the material may be optical glass, optical resin, or a glass-plastic mixture, to correct chromatic aberrations, as shown in FIG. 6.

Figure 7:
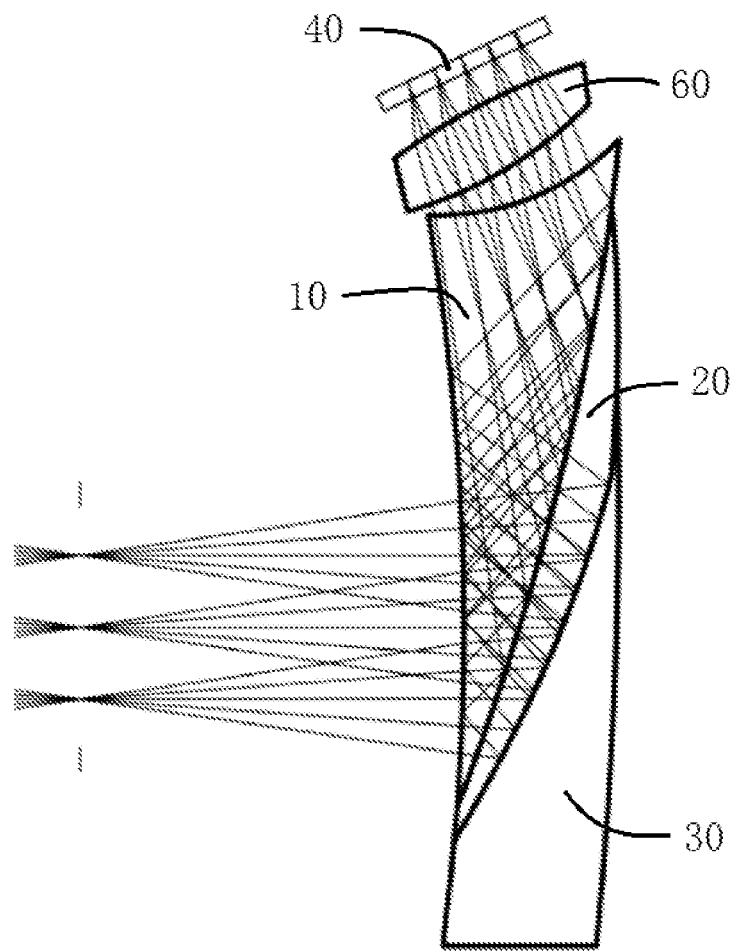
FIG. 7 is a cross-sectional view of a virtual image display device according to some embodiments of the present disclosure.

Alternatively, in some embodiments, a free-form prism 60 may be added between the primary lens 10 and the micro-display panel 40, to improve definition and correct distortion, as shown in FIG. 7.

For the ultra-thin lens of each embodiment of the present disclosure, the micro-display panel may be fixed close to an incident surface of the primary lens 10 by a bezel to form the virtual image display device. An image source is provided facing the first optical surface 106. The image light emitted by the micro-display panel is directed to the first optical surface 106 of the primary lens 10. In particular, for the lens in the foregoing embodiment or the like, the bezel may further include a flexible surround, to enclose edged of the primary lens, the intermediate lens, and the secondary lens, so as to enable the entire ultra-thin lens to be sealed. The flexible surround ensures that the ultra-thin lens remains sealed even when the primary lens, the intermediate lens, and the secondary lens are cut to other shapes due to the shape of the frame of the eyeglasses.

Near-Eye Display

Figure 8:
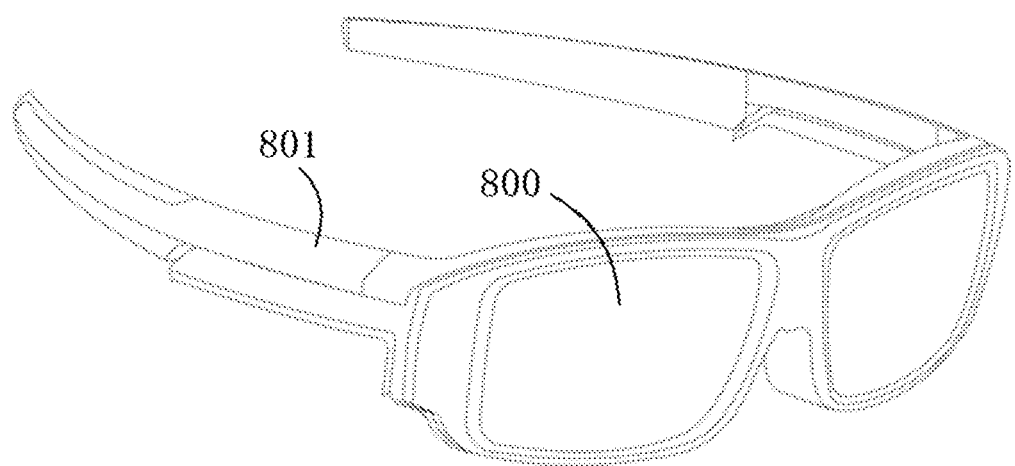
FIG. 8 is a schematic diagram of a near-eye display in a form of eyeglasses according to some embodiments of the present disclosure.

According to another aspect of the present disclosure, because the virtual image display device formed by the lenses in the foregoing embodiments can be used as an optical element of the near-eye display, with thinness and lightness, the near-eye display of the present disclosure is made to have an appearance similar to that of ordinary corrective glasses or fashionable sunglasses, as shown in FIG. 8. The near-eye display includes a virtual image display device including the lenses of the embodiments of the present disclosure and a micro-display panel of a predetermined size. A lens 800 is placed directly in front of a user eye, and in some embodiments is provided in a form of binoculars in a body of the eyeglasses. In a scenario in which monocular display is desired, it is necessary to mount only a monocular micro-display panel. In this case, a weight difference between two sides is small, and a uniform appearance can be achieved without any separate counterweight. Due to the action of a light splitting layer on a light exit surface in a virtual image, light from a real-world scene (that is, the environmental light) and image light from the micro-display panel merge at the user eye, thus allowing the user to see a merged image.

Generally, the thinness and lightness allow the user to wear the near-eye display device in the form of eyeglasses of the present disclosure comfortably and for a relatively long time, both indoors and outdoors. In addition to the lens part, an additional sensor may further be built into the frame of the eyeglasses to obtain various information, to determine what type of AR image is appropriate and where it should be provided on the overall image, such as environment construction with depth cameras, inertial measurement units, and motion tracking technologies. Various corresponding sensors and controllers in the prior art all can constitute various data obtained and required for sensing the foregoing near-eye display of the present disclosure. The controller may be a general-purpose data processing and control device, such as a central processing unit (CPU) or other microprocessors. A person skilled in the art should understand that, the sensors and their accompanying circuits, as well as a main board on which a CPU is usually mounted, and the like (such as battery) are usually placed in temples 801, which increases the weight of the device in the form of eyeglasses. Therefore, the device should be as small as possible to minimize the effect of reducing the comfort of wearing the eyeglasses. From the perspective of fashion, the thinness and lightness allow the device in the form of eyeglasses of the present disclosure to be also suitable for wearing in various decorative occasions. For example, when a protective effect like sunglasses is desired, a filter film may be coated on an outer side of the secondary lens to filter excessive sunlight or some harmful light, which is easy to realize.

In some embodiments, a display system can also be provided, including one or more of the ultra-thin lenses described above. The system can further include one or more processors configured to control image rendering through the ultra-thin lens. The system can be, for example, a gaming system, where one or more players can participate with one or more of the glasses. The gaming system can further include a sound system for user experience.

The foregoing detailed description of the present technology is only for description, but is not intended to provide an exhaustive explanation or limit the present technology in an accurate form disclosed in this specification. In view of the foregoing teachings, various modifications and variations are possible. The described embodiments are only intended to better illustrate the principles of the present technology and practical applications thereof, so that a person skilled in the art may utilize the present technology better, and various modifications suitable for specific purposes are also feasible. The scope of the present technology is defined by the appended claims.

What is claimed is:

1. An ultra-thin lens, comprising a primary lens, an intermediate lens, and a secondary lens, wherein
   the primary lens comprises at least three effective optical surfaces, wherein a first optical surface is an incident surface, a second optical surface is a surface adjacent to a human eye side, and a third optical surface is a surface adjacent to an environmental side; and the primary lens receives image light from a micro-display panel that is transmitted into the primary lens with the first optical surface as an incident surface, propagates in a direction of the third optical surface, and then undergoes total reflection at the third optical surface and the second optical surface in sequence, and the image light after total reflection by the second optical surface is transmitted from the primary lens through the third optical surface and directed to the intermediate lens;
   the intermediate lens comprises two effective optical surfaces: a fourth optical surface and a fifth optical surface; and the fourth optical surface is provided adjacent to the third optical surface and has a predetermined gap therewith, the image light directed to the intermediate lens is transmitted into the intermediate lens through the fourth optical surface, and part of the image light is reflected by the fifth optical surface back to the intermediate lens, and then transmitted through the fourth optical surface, the third optical surface, and the second optical surface in sequence, to the human eye for imaging;
   the secondary lens is provided adjacent to the fifth optical surface, and environmental light is imaged to the human eye through the secondary lens, the intermediate lens, and the primary lens; and
   at least a surface of the primary lens and a surface of the secondary lens form a first outer surface of the ultra-thin lens toward an exit pupil side, and a surface of the primary lens, a surface of the intermediate lens, and a surface of the secondary lens jointly form a second outer surface of the ultra-thin lens toward the environmental side.

2. The ultra-thin lens according to claim 1, wherein:
   an incident angle of the image light first directed to the third optical surface satisfies a total reflection condition inside the primary lens; and an incident angle of the image light first directed from the third optical surface to the second optical surface satisfies the total reflection condition inside the primary lens.

3. The ultra-thin lens according to claim 1, wherein:
   surface types of the first optical surface, the second optical surface, and the third optical surface comprise at least one of a free-form surface, a spherical surface, or an aspherical surface.

4. The ultra-thin lens according to claim 1, wherein:
the fourth optical surface and the third optical surface have the same surface type, and a distance between the fourth optical surface and the third optical surface does not exceed 1 mm.

5. The ultra-thin lens according to claim 1, wherein:
the fifth optical surface has a surface type selected from one of a free-form surface, a spherical surface, or an aspherical surface, and the fifth optical surface is coated with a reflective film having a predetermined transmission-reflection ratio.

6. The ultra-thin lens according to claim 1, wherein:
the secondary lens comprises two effective optical surfaces: a sixth optical surface and a seventh optical surface, and the sixth optical surface and the fifth optical surface have the same surface type and are adhered.

7. The ultra-thin lens according to claim 6, wherein:
the seventh optical surface has a surface type similar to a surface type of the second optical surface.

8. The ultra-thin lens according to claim 6, wherein:
the primary lens further comprises a first surface and a second surface provided opposite to each other;
the intermediate lens further comprises a third surface;
the secondary lens further comprises a fourth surface and a fifth surface provided opposite to each other;
the first outer surface consists of the first surface and the second optical surface of the primary lens and the fourth surface of the secondary lens; and
the second outer surface consists of the second surface of the primary lens, the third surface of the intermediate lens, and the fifth surface of the secondary lens.

9. The ultra-thin lens according to claim 8, wherein:
the first surface, the fourth surface, and the second optical surface have the same surface type; or the first surface, the fourth surface, and the second optical surface have different surface types, have smooth transitions therebetween, or have spliced regions with abrupt curvature; and
the second surface, the fifth surface, and the third surface have the same surface type; or the second surface, the fifth surface, and the third surface have different surface types, have smooth transitions therebetween, or have spliced regions with abrupt curvature.

10. The ultra-thin lens according to claim 1, wherein:
the first outer surface has a surface type similar to a surface type of the second outer surface, to achieve a see-through effect of environmental light without optical power; or
the first outer surface and the second outer surface form a surface type difference to have a predetermined diopter to a user.

11. The ultra-thin lens according to claim 1, wherein:
the first outer surface and the second outer surface are each formed as a spherical surface, an aspherical surface, or a free-form surface.

12. The ultra-thin lens according to claim 1, wherein:
the intermediate lens extends in a direction perpendicular to an optical axis to cover an effective light-transmitting aperture range of the image light transmitted from the third optical surface.

13. The ultra-thin lens according to claim 1, wherein:
the image light forms no intermediate image within the ultra-thin lens.

14. A virtual image display device employing the ultra-thin lens according to claim 1, further comprising a micro-display panel as an image source, wherein the micro-display panel is provided facing the first optical surface, and image light emitted by the micro-display panel is directed to the first optical surface of the primary lens.

15. The virtual image display device according to claim 14, further comprising a lens provided between the micro-display panel and the first optical surface, wherein the lens is a single lens, a positive-negative glued lens, or a lens group.

16. The virtual image display device according to claim 14, wherein the micro-display panel is selected from a micro organic light-emitting diode (micro-OLED), a micro-light-emitting diode (micro-LED), a liquid crystal on silicon (LCoS), a micro liquid crystal display (micro LCD), or a digital light processing (DLP) display.

17. The virtual image display device according to claim 14, wherein the micro-display panel is fixed adjacent to the first optical surface of the primary lens by a bezel.

18. The virtual image display device according to claim 14, wherein further comprising a flexible surround to enclose edges of the secondary lens, the intermediate lens, and the primary lens in close proximity, so as to enable the entire lens to be sealed.

19. An eyeglass comprising a near-eye display including the virtual image display device according to claim 14 placed in a lens position in a body of the eyeglasses, and further comprising a main board and a battery placed in legs of the eyeglasses.

20. A display system comprising at least the ultra-thin lens according to claim 1, further comprising a processor configured to control image rendering through the ultra-thin lens.

* * * * *